US008322952B2

(12) United States Patent
Tugend et al.

(10) Patent No.: US 8,322,952 B2
(45) Date of Patent: Dec. 4, 2012

(54) BORE HEAD

(75) Inventors: Raymond Tugend, Uberach (FR); Alain Freyermuth, Pfaffenhoffen (FR)

(73) Assignee: E.B.P, Bouxwiller (FR)

( * ) Notice: Subject to any disclaimer, the term of this patent is extended or adjusted under 35 U.S.C. 154(b) by 1001 days.

(21) Appl. No.: 11/661,583

(22) PCT Filed: Jul. 28, 2005

(86) PCT No.: PCT/FR2005/001981
§ 371 (c)(1),
(2), (4) Date: Dec. 14, 2007

(87) PCT Pub. No.: WO2006/027446
PCT Pub. Date: Mar. 16, 2006

(65) Prior Publication Data
US 2008/0191429 A1  Aug. 14, 2008

(30) Foreign Application Priority Data
Aug. 31, 2004 (FR) ..................... 04 09225

(51) Int. Cl.
*B23B 29/03* (2006.01)
(52) U.S. Cl. ........................ 408/143; 408/181
(58) Field of Classification Search ............. 408/143, 408/181–185, 153; B23B 29/00, 29/03, 29/034, B23B 29/04, 29/02
See application file for complete search history.

(56) References Cited

U.S. PATENT DOCUMENTS

| 2,282,919 | A | * | 5/1942  | Zempel    | 408/179 |
| 2,305,737 | A | * | 12/1942 | Richards  | 408/181 |
| 2,654,610 | A | * | 10/1953 | De Vlieg  | 279/6 |
| 3,044,323 | A | * | 7/1962  | Sweeny    | 408/151 |
| 4,626,144 | A | * | 12/1986 | Berner    | 408/143 |
| 4,861,202 | A | * | 8/1989  | Fendler   | 408/181 |
| 4,955,767 | A | * | 9/1990  | Kaiser et al. | 408/146 |
| 5,116,194 | A | * | 5/1992  | Pfalzgraf et al. | 408/181 |
| 5,396,693 | A | * | 3/1995  | Lohner    | 29/527.1 |

(Continued)

FOREIGN PATENT DOCUMENTS
DE    30 44 862    9/1981
(Continued)

*Primary Examiner* — Daniel Howell
(74) *Attorney, Agent, or Firm* — The Watson I.P. Group, PLC; Jovan N. Jovanovic; Vladan M. Vasiljevic

(57) ABSTRACT

The present invention concerns a bore head, which consists essentially of a body (1) provided with a radial piston (2) for receiving a bore tool (3) which can be tightened in said radial piston (2) with a tightening means (4), where the position of said radial piston (2) can be regulated by means of a micrometric screw (5), and where the radial piston is guided and tightened in the regulation position with a guidance and tightening means, and where, moreover, said body is provided with a balancing device (7) with balancing weights (8 and 9).

Bore head characterized in that the means (4) for tightening the bore tool (3) in the radial piston (2) of the body (1) is in the form of a screwing device (10), equipped with a movable center punch (11) which is under tension caused by a spring (12), and in that the means for guidance and tightening in the position of regulation of the radial piston (2) is an indirect tightening means which carries out said guidance and tightening radially.

The invention can be applied more particularly in the field of accessories for machine tools, with digital control, for machining centers, cells and workshops for multiple purposes.

9 Claims, 2 Drawing Sheets

U.S. PATENT DOCUMENTS 5,454,667 A * 10/1995 Cirino et al. .................. 408/181

FOREIGN PATENT DOCUMENTS

| | | |
|---|---|---|
| DE | 36 16 230 | 11/1987 |
| EP | 249892 A2 * | 12/1987 |
| FR | 2 662 103 | 11/1991 |
| JP | 10071509 A * | 3/1998 |
| JP | 10309607 A * | 11/1998 |
| SU | 435070 A * | 11/1974 |
| SU | 1074661 A * | 2/1984 |

* cited by examiner

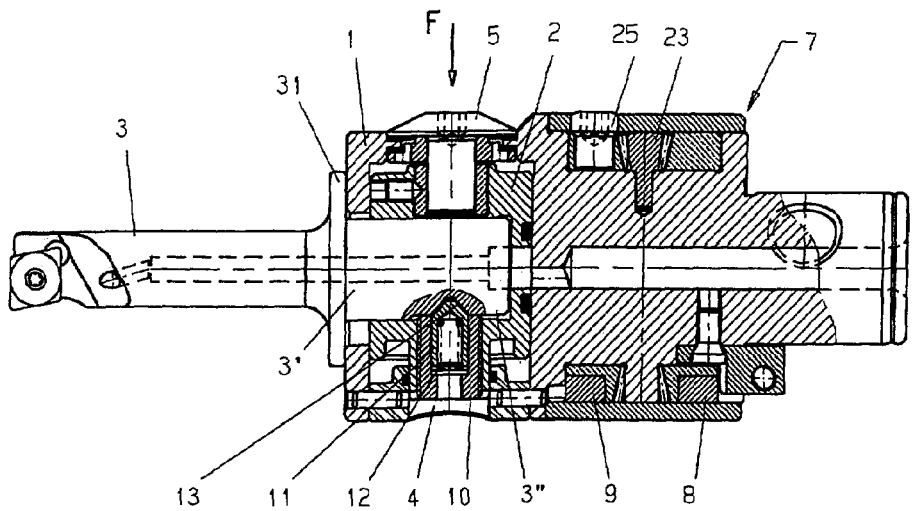
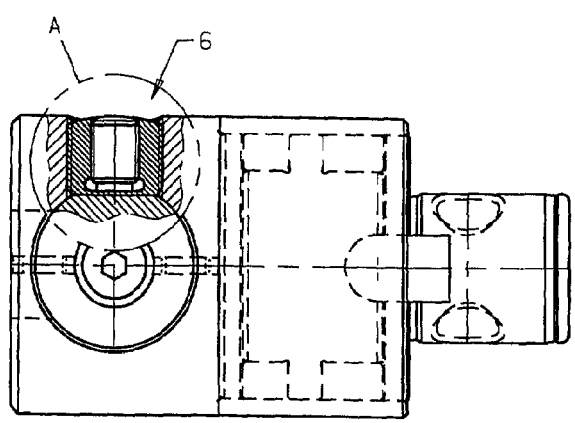
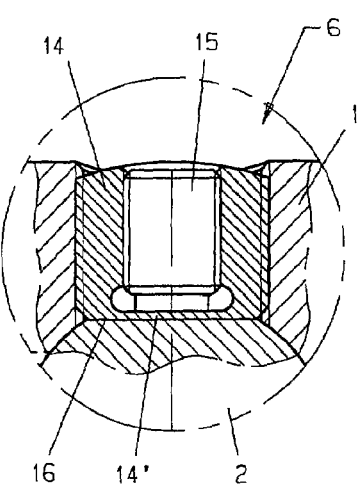
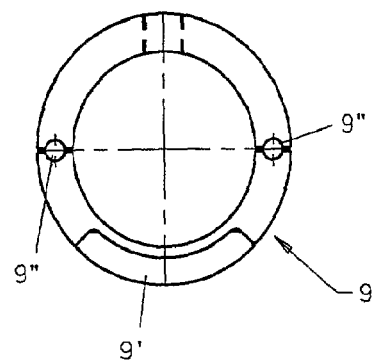

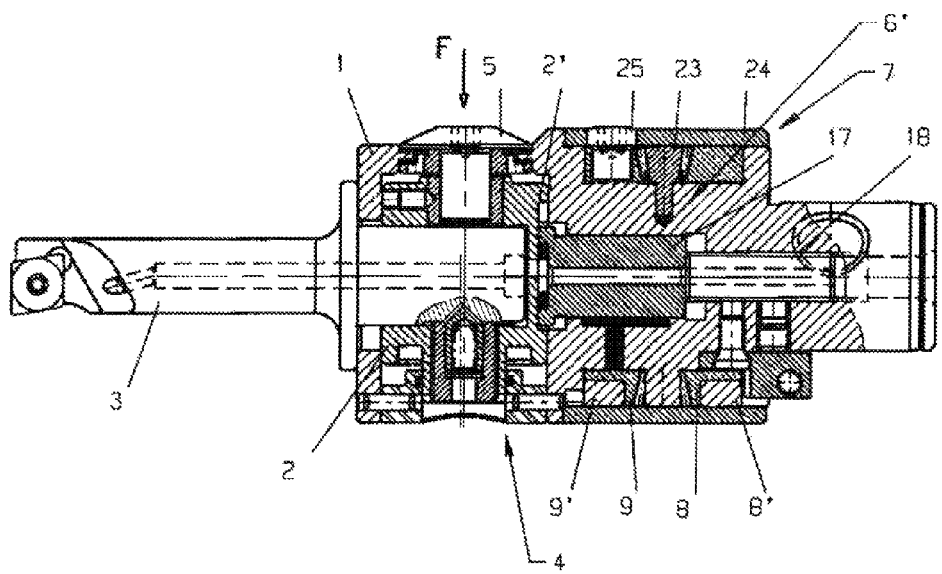
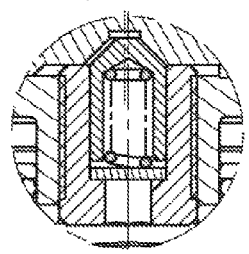
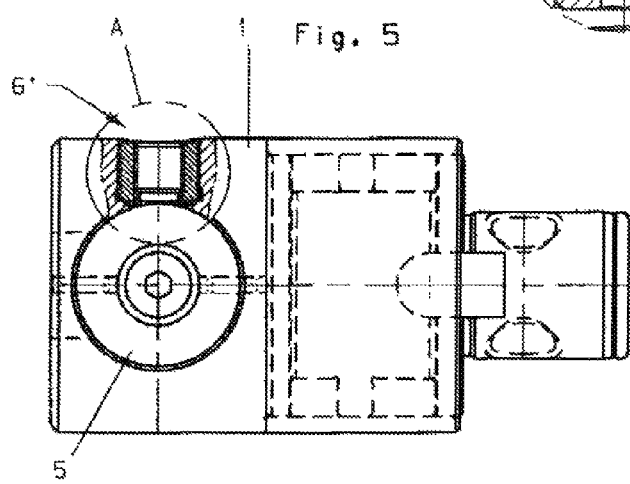
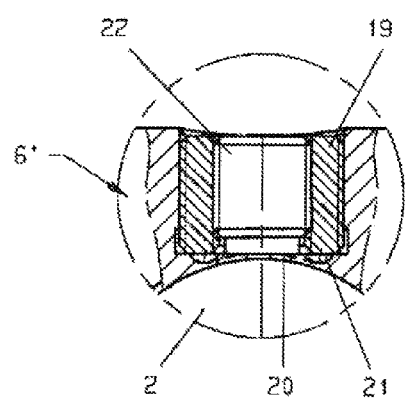

BORE HEAD

The present invention relates to the field of accessories for machine tools, with digital control, for machining centers, cells and workshops for multiple purposes, and its object is a bore head for producing precise holes, which present very rigorous geometric characteristics, by means of interchangeable bore tools.

Devices are currently known for adjusting the chosen diameter, but a weight unbalance necessarily develops in them, leading to unbalance during the boring operation; this unbalance is greater the greater the speeds of rotation become. However, the modern machines and the novel materials that are generally used allow high cutting rates.

Precision during the regulation is thus very important for this type of tool holder, and it is also indispensable to prevent any dispersion during the final locking.

To overcome this drawback, a balancing device has been proposed, according to FR-A2 561 555, for the drilling, which device is in the form of two balancing weights that are connected to each other at their ends by flexible links and mounted on the drilling tool holder, where these balancing weights can be set in rotation by means of a covering, single-operation, sleeve which can be blocked in the regulated position by means of a set screw.

While this device allows the correction of an unbalance caused by an offset tool, it does not offer sufficient precision to eliminate the unbalance, particularly when the tool must rotate at very high speeds, because the two balancing weights that are connected to each other by flexible links are difficult to regulate with sufficient precision. In addition, this device is also exposed to wear which particularly affects the links that join the balancing weights, so that there is a risk of said links stretching, with a resulting reduction in the precision of the regulation.

Moreover, according to this document, the positioning of the tool is ensured only by a reception bore provided in a sliding nut which can be displaced and regulated radially, and which is locked simply by means of a set screw, so that dispersion during the final locking is unavoidable.

A bore head is also known from FR-A-2 662 103, which consists of a body equipped with a radial piston for receiving a bore tool which can be tightened by means of a screw, where the position of said piston can be regulated by means of a micrometric screw. In this bore head, the body is also provided with a sliding nut for guiding and orientation, and an end-of-stroke abutment for the piston for receiving the bore tool, as well as a balancing device with independent balancing weight.

This embodiment substantially improves the possibilities for regulating and locking the tool, and compensating for the unbalance. However, there is no provision for fixation of the tool, particularly by deformation of the material.

However, taking into account the constant evolution of the machines and of the tools, it is necessary now to ensure a precision for regulating the positioning of the tool, which is on the order of barely a few microns; such a requirement is incompatible with tightening means that simultaneously orient the tool holder.

The purpose of the present invention is to overcome these drawbacks by proposing a bore head for guidance and tightening the radial piston for receiving a bore tool along the same axis, in such a way that the precision of the positioning of the tool is improved.

To this effect, the bore head according to the invention, which consists of a body equipped with a radial piston for receiving a bore tool, which can be tightened in said radial piston with a tightening tool, where the position of said radial piston can be regulated by means of a micrometric screw, the piston being guided and tightened in the regulation position with a guide and tightening means, and where, moreover, said body is provided with a balancing device with balancing weights, is characterized in that the means for tightening the bore tool in the radial piston of the body is in the form of a screwing device, which is equipped with a movable center punch which is under tension caused by a spring, and in that the means for guidance and tightening, in the position of regulation of the radial piston, is an indirect tightening means which achieves said guidance and tightening radially.

The invention will be better understood with the help of the following description which relates to preferred embodiments given as nonlimiting examples and explained with reference to the schematic drawings in the appendix, in which:

FIG. 1 is a lateral elevation view with partial cross section through the bore head according to the invention;

FIG. 2 is a view analogous to that of FIG. 1, along F in FIG. 1, without the bore tool;

FIG. 3 is a view on an enlarged scale of the detail A of FIG. 2;

FIG. 4 is a lateral elevation view with partial cross section through the bore head according to a second embodiment of the invention;

FIG. 4a is a partial blow up of a portion of the bore head of FIG. 4;

FIG. 5 is a view analogous to that of FIG. 4, along F in FIG. 4 without the bore tool;

FIG. 6 is a view of an enlarged scale of the detail A of FIG. 5;

FIG. 7 is a lateral elevation view of the balancing weight 9 of the balancing device 7.

FIGS. 1-3 and 4-6 of the drawings in the appendix represent, as examples, two bore heads, which consist essentially of a body 1 equipped with a radial piston 2 for receiving a bore tool 3, which can be tightened in said radial piston 2, with a tightening means 4, where the position of said radial piston 2 can be regulated by means of a micrometric screw 5, and where the radial piston is guided and tightened in the regulation position with a means 6 for guidance and tightening, and where, moreover, said body is provided with a balancing device 7 with balancing weights 8 and 9.

According to the invention, and according to a first embodiment represented in FIGS. 1-3 of the drawings in the appendix, the means 4 for tightening the bore tool 3 in the radial piston 2 of the body 1 is in the form of a screwing device 10, which is equipped with a movable center punch 11 which is under tension caused by the spring 12, and the means 6 for guidance and tightening, in the position of regulation of the radial piston 2 (FIGS. 2 and 3), is an indirect tightening means which achieves said guidance and tightening radially. In a known manner, the tool 3 presents a bearing flange 31 resting against the front face of the body 1, and a coupling part 3' which is located in the movable piston 2, extending behind said flange 31, on the opposite side of the tool 3.

The screwing device 10, which is equipped with a movable center punch 11 under tension caused by the spring 12, is in the form of a threaded sleeve 10 which is equipped, at its end which opens to the outside of the body 1 at the end of the movable piston 2 opposite the micrometric screw 5, with a hole for receiving a means for driving in rotation, and, at its end which is turned towards the coupling part 3' of the tool 3 in the movable piston 2, with a center punch 11 under tension caused by a spring 12 and working in cooperation by means its conical end with a conical hole 13 provided in a flat part 3"

of the coupling part 3' of the tool 3, where said flat part forms a bearing face for the corresponding end of the threaded sleeve 10 surrounding the center punch 11.

It is preferred for the conical hole 13 provided on the part 3' of the tool 3 to present a width which is greater than those of the center punch 11, and for the distance between its axis and the corresponding bearing face of the flange 31 on the body 1 to be less than the distance between the front face of the body 1 and the axis of the screwing device 10 forming the means 4 for tightening the bore tool 3. The result is that, during the tightening of the means 4 in the movable piston 2, after the placement of the tool 3, screwing the device 10 in the corresponding threading of the movable piston 2 first has the effect of centering the head of the center punch 11 in the conical hole 13 provided in the flat area 3" of the coupling part 3' of the tool 3, which results, on the one hand, in a perfect alignment of the flat part 3" with the corresponding face of the sleeve 10 because of the conicity of the contacting elements, and, on the other hand, a traction on the coupling part 3', which tends to apply the back face of the flange 31 of the tool 3 against the front face of the body 1.

In the tightening movement consecutive to this displacement of the tool 3, the sleeve 10 is applied with its corresponding face on the flat part 3" of the coupling part 3' of the tool 3, which has the effect of orienting, definitively and perfectly, the tool 3, and of tightening it in the position of application of the flange 31 against the corresponding face of the body 1, in the movable piston 2.

The means 6 for guidance and tightening, in the position of regulation of the radial piston 2, is represented more particularly in FIGS. 2 and 3 of the drawings in the appendix. This means 6 achieves an indirect tightening and it is advantageously constructed in the form of a blind threaded sleeve 14 which accommodates a flat point screw 15 and rests with its closed end on a flat part 16 provided on the radial piston 2 for receiving the tool 3, which is guided in the body 1, where the wall 14' of the sleeve 14 closes its bearing end on the radial piston 2 which presents a small thickness and is elastically deformable. The flat point screw 15 is equipped with a known means for driving in rotation.

Thus, after the regulation of the position of the tool 3 by means of the micrometric screw 5, and tightening with the tightening means 4, the radial piston 2—tool 3 assembly can be tightened definitively with the means 6 for guidance and tightening in position. To this effect, the blind threaded sleeve 14 is applied first to the flat area 16 of the radial piston 2, thus orienting it, and then the flat point screw 15 is tightened in the sleeve 14, so that a slight deformation of the wall 14' of the sleeve 14 occurs, and thus a more point-shaped complementary tightening of said radial piston 2. The result is that, after the perfect orientation of the radial piston 2, any operational tolerance that remains in the guidance of said radial piston 2 is compensated by the complementary tightening achieved by means of the flat point screw 15, so that the tightening for immobilizing the radial piston 2 is entirely carried out radially along the same axis.

FIGS. 4-6 in the drawings of the appendix represent an embodiment variant of the invention, in which the tightening and the orientation of the radial piston 2 are carried out along two perpendicular axes, the axial and the radial axis, respectively.

In this embodiment, the means 6' for guidance and tightening in the position of regulation of the radial piston 2, is also an indirect tightening means, but it consists, on the one hand, of an axial pusher element 17 which is accommodated in the body 1, rests with its end on a flat area 2' of the radial piston 2 and is loaded at its opposite end with an adjustment screw 18, and, on the other hand, of a threaded sleeve 19 which is accommodated in the body 1 and extends to a thin wall 20 delimited on the guide of the movable piston 2 by a peripheral groove 21 ensuring the constancy of the thickness of said wall, and by a flat point screw 22 which is guided in the sleeve 19 and rests on the thin wall 20.

According to a characteristic of the invention, the axial pusher element 17 is accommodated in the body 1 with adjustment by tightening, or adjustment by injection under pressure of a resin forming a guidance cushion (shown partially in FIG. 4).

Thus, the orientation of the radial piston 2 is carried out with the axial pusher element 17 by means of the screw 18. After the regulation of the position of the tool 3, the tightening in position of the radial piston 2 is carried out by means of the flat point screw 22, which is tightened in the threaded sleeve 19. In the context of this tightening, the thin wall 20 is exposed to the load of the force exerted by the flat point screw 22, which is transformed into a force for tightening the radial piston 2 in its housing.

The device 7 for balancing with balancing weights 8 and 9, which is provided on the body 1, consists of two toothed crowns forming the balancing weights 8 and 9, which toothed crowns engage with at least two conical pinions 23, which are guided radially in the body 1, where one of the balancing weights, namely balancing weight 9 in the example represented in FIGS. 1 and 4 of the drawings in the appendix, is connected to a regulation ring 24 with a screw 25. Thus, it is possible to regulate the unbalance by actuating the ring 24 which, by driving the balancing weight 9 in a direction of rotation, causes the rotation of the balancing weight 8 in the opposite direction with conical pinions 23. After regulating the unbalance, it is possible to block the device 7 in position by completely screwing in the drive screw 25, which then rests against the bottom of the guide of the balancing weight 9.

According to a characteristic of the invention, each balancing weight 8 and 9 is has an unbalance in the form of a recess (not shown) or an additional balancing weight 8', 9' whose density differs from that of the constitutive material of the balancing weights.

According to another characteristic of the invention, the toothed crowns forming the balancing weights 8 and 9 are advantageously in the form of two half rings that are connected to each other with pins 9". This embodiment of the balancing weights 8 and 9 in the form of half rings is intended to allow a very precise machining of the balancing weights, to facilitate their installation with an optimal tolerance range in the guide grooves of the body 1. To this effect, after the machining, the balancing weights 8 and 9 are cut diametrically by sawing, after producing beforehand two diametrically opposite drilled bores, whose diameter corresponds precisely to that of the pins 9". The result is that the pitch of the gear teeth, which is produced on the half ring so obtained, is guaranteed perfectly.

The installation of the balancing weights 8 and 9, as well as of the conical pinions 23 is particularly easy to carry out, and maintaining them in the body 1 is achieved by simply sliding the driver 24 on the mounted pieces and screwing the screw 25 into the corresponding balancing weight 9.

FIG. 7 of the drawings in the appendix is a lateral elevation view of the balancing weight 9. The balancing weight 8 is identical to the balancing weight 9, with the exception of the threading for receiving the drive screw 25.

Thanks to the invention, it is possible to produce a bore head which allows a perfect and reliable positioning of the tool, as well as a very precise regulation of the unbalance.

Naturally, the invention is not limited to the embodiments that have been described and represented in the drawings of the appendix. Modifications remain possible, notably with regard to the constitution of the various elements, or substitution with a technically equivalent means, without thereby exceeding the scope of protection of the invention.

The invention claimed is:

1. A bore head, comprising: a body (1) equipped with a radial piston (2) for receiving a bore tool (3), which can be tightened in said radial piston (2) with a tightening means (4), where the position of said radial piston (2) can be regulated by means of a micrometric screw (5), and where the radial piston is guided and tightened in the regulation position with a guidance and tightening means (6, 6'), and where, moreover, said body is provided with a balancing device (7) with balancing weights (8 and 9), wherein the means (4) for tightening the bore tool (3) in the radial piston (2) of the body (1) is in the form of a screwing device (10), which is equipped with a movable center punch (11) under tension caused by a spring (12), and in that the means (6, 6') for guidance and tightening in the regulation position of the radial piston (2) is an indirect tightening means, which acts radially against the radial piston.

2. Bore head according to claim 1, characterized in that the screwing device (10), is in the form of a threaded sleeve (10) which is provided, at its end opening to the outside of the body (1) at the end of the movable piston (2) opposite the micrometric screw (5), with a hole for receiving a means for driving in rotation, and, at its end which is turned towards the coupling part (3') of the tool (3) in the movable piston (2), with a center punch (11) which is under tension caused by a spring (12) and works in cooperation by means of its conical end with a conical hole (13) provided in a flat area (3") of the coupling part (3') of the tool (3), where said flat part forms a bearing face for the corresponding end of the threaded sleeve (10) surrounding the center punch (11).

3. Bore head according to claim 2, characterized in that the conical hole (13) provided on the coupling part (3') of the tool (3) presents a width which is greater than those of the center punch (11), and the distance between its axis and the corresponding bearing face of the flange (31) resting on the body (1) is less than the distance between the front face of the body (1) and the axis of the screwing device (10) forming the means (4) for tightening the bore tool (3).

4. Bore head according to claim 1, characterized in that the guidance and tightening means (6) is an indirect tightening means, which carries out said guidance and tightening radially and which is constructed in the form of a blind threaded sleeve (14) accommodating a flat point screw (15) and resting with its closed end on a flat area (16) provided on the radial piston (2) for receiving the tool (3), which is guided in the body (1), where the wall (14') of the sleeve (14) closes its bearing end on the radial piston (2) which presents a small thickness and is elastically deformable.

5. Bore head according to claim 1, characterized in that the means (6') for guidance and tightening in the position of regulation of the radial piston (2) is an indirect tightening means which carries out said guidance and tightening along two perpendicular axes, an axial axis and a radial axis, respectively, and which consists, on the one hand, of an axial pusher element (17) which is accommodated in the body (1), rests with its end on a flat area (2') of the radial piston (2), and is loaded at its opposite end with an adjustment screw (18), and, on the other hand, of a threaded sleeve (19) which is accommodated in the body (1) and extends to a thin wall (20) which is delimited on the guide of the movable piston (2) by a peripheral groove (21) ensuring the constancy of the thickness of said wall and by a flat point screw (22), which is guided in the sleeve (19) and rests on the thin wall (20).

6. Bore head according to claim 5, characterized in that the axial pusher element (17) is accommodated in the body (1) with adjustment by tightening through a flat point screw, or adjustment by injection under pressure of a resin forming a guidance cushion.

7. Bore head according to claim 1, characterized in that the balancing device (7) with the balancing weights (8 and 9), which is provided on the body (1), consists of two toothed crowns forming the balancing weights (8 and 9), which toothed crowns engage with at least two conical pinions (23) which are guided radially in the body (1), where one of the balancing weights (9) is connected to a regulation ring (24) with a screw (25).

8. Bore head according to claim 7, characterized in that each balancing weight (8 and 9) has an unbalance in the form of at least one of a recess, and an additional balancing weight (8', 9') whose density is different from that of the constitutive material of the balancing weights.

9. Bore head according to claim 7, characterized in that the toothed crowns forming the balancing weights (8 and 9) are in the form of two half rings which are connected to each other with pins (9").

* * * * *